United States Patent
Chen et al.

(10) Patent No.: US 9,092,864 B2
(45) Date of Patent: Jul. 28, 2015

(54) DISPLACEMENT DETECTION APPARATUS AND METHOD

(71) Applicant: PIXART IMAGING INC., Science-Based Industrial Park Hsin (TW)

(72) Inventors: Chun-Wei Chen, Hsin-Chu (TW); Ren-Hau Gu, Hsin-Chu (TW); Shih-Wei Kuo, Hsin-Chu (TW)

(73) Assignee: PIXART IMAGING INC, Hsin-Chu (TW)

( * ) Notice: Subject to any disclaimer, the term of this patent is extended or adjusted under 35 U.S.C. 154(b) by 189 days.

(21) Appl. No.: 13/943,300

(22) Filed: Jul. 16, 2013

(65) Prior Publication Data

US 2013/0301880 A1 Nov. 14, 2013

Related U.S. Application Data

(63) Continuation-in-part of application No. 12/956,993, filed on Nov. 30, 2010, now Pat. No. 8,515,129.

(51) Int. Cl.
| | |
|---|---|
| *G06K 9/00* | (2006.01) |
| *G06T 7/00* | (2006.01) |
| *G06F 3/03* | (2006.01) |
| *G06F 3/038* | (2013.01) |
| *G06F 3/0354* | (2013.01) |

(52) U.S. Cl.
CPC ............ *G06T 7/0044* (2013.01); *G06F 3/0304* (2013.01); *G06F 3/0383* (2013.01); *G06F 3/03543* (2013.01)

(58) Field of Classification Search
None
See application file for complete search history.

(56) References Cited

U.S. PATENT DOCUMENTS

| | | | |
|---|---|---|---|
| 5,898,170 A * | 4/1999 | Featherston et al. ...... 250/231.18 |
| 5,917,958 A * | 6/1999 | Nunally et al. ............... 382/276 |
| 6,040,821 A * | 3/2000 | Franz et al. .................... 345/159 |
| 6,363,160 B1 * | 3/2002 | Bradski et al. ................ 382/103 |
| 6,380,986 B1 * | 4/2002 | Minami et al. ................ 348/699 |
| 6,664,948 B2 * | 12/2003 | Crane et al. .................... 345/166 |
| 7,116,801 B2 | 10/2006 | Lin |
| 7,142,695 B2 | 11/2006 | Lin |
| 7,167,161 B2 | 1/2007 | Ahn |
| 7,444,006 B2 | 10/2008 | Lin |
| 8,013,841 B2 * | 9/2011 | Bieber et al. ................... 345/166 |
| 8,264,462 B2 * | 9/2012 | Mellot ........................... 345/166 |
| 8,300,888 B2 * | 10/2012 | Chang et al. ................... 382/103 |
| 2003/0058218 A1 * | 3/2003 | Crane et al. .................... 345/158 |
| 2004/0017355 A1 * | 1/2004 | Shim .............................. 345/157 |
| 2005/0110746 A1 * | 5/2005 | Hou ............................... 345/156 |
| 2006/0164393 A1 * | 7/2006 | Wu et al. ........................ 345/163 |
| 2006/0197664 A1 * | 9/2006 | Zhang et al. ................... 340/555 |
| 2008/0031513 A1 * | 2/2008 | Hart ............................... 382/154 |
| 2008/0232645 A1 * | 9/2008 | Billinghurst et al. .......... 382/103 |
| 2008/0316174 A1 * | 12/2008 | Mellot ........................... 345/166 |
| 2009/0195505 A1 * | 8/2009 | Chen et al. ..................... 345/166 |
| 2010/0088652 A1 * | 4/2010 | Ramsay et al. ................ 715/857 |
| 2011/0032185 A1 * | 2/2011 | Yamamoto et al. ............ 345/157 |
| 2011/0150363 A1 * | 6/2011 | Chen et al. ..................... 382/291 |

* cited by examiner

*Primary Examiner* — Avinash J Yentrapati

(74) *Attorney, Agent, or Firm* — Lowe Hauptman & Ham, LLP

(57) ABSTRACT

A displacement detection method includes the steps of: capturing a first frame and a second frame; selecting a first block with a predetermined size in the first frame and selecting a second block with the predetermined size in the second frame; determining a displacement according to the first block and the second block; comparing the displacement with at least one threshold; and adjusting the predetermined size according to a comparison result of comparing the displacement and the threshold. The present invention further provides a displacement detection apparatus.

20 Claims, 14 Drawing Sheets

DISPLACEMENT DETECTION APPARATUS AND METHOD

CROSS REFERENCE TO RELATED APPLICATION

This application is a continuation-in-part application of U.S. Ser. No. 12/956,993, filed on Nov. 30, 2010, the full disclosure of which is incorporated herein by reference.

BACKGROUND

1. Field of the Invention

This invention generally relates to a displacement detection apparatus and method and, more particularly, to a displacement detection apparatus and method that can adaptively adjust the size of comparison blocks.

2. Description of the Related Art

A conventional optical mouse continuously captures images of a working surface with an image sensor and compares the correlation between a reference frame and a current frame sensed by the sensor array of the image sensor in a sampling period to calculate a displacement. After the displacement is obtained, the current frame is updated to a new reference frame and the correlation between the updated reference frame and a newly captured current frame will be compared in the next sampling period so as to obtain a next displacement. However, the aforementioned displacement detection method has the problem of being unable to detect small displacement and low detection accuracy.

Please refer to FIG. 1, it shows a displacement detection method capable of detecting small displacement and disclosed in U.S. Pat. No. 7,167,161. In a first sampling period, an image sensor captures a first current frame 92 to be stored in a storage unit. In the meanwhile, a reference frame 91 has been stored in the storage unit, wherein the reference frame 91 is an image frame captured by the image sensor in a sampling period previous to the first sampling period. A first reference block 91a is set for comparing the correlation. Next, a processing unit sequentially searches the first current frame 92 from the top left to the right bottom to find the position of a first search block 92a having the highest correlation with the first reference block 91a, and then calculates a position difference therebetween. For example in FIG. 1, the position difference between the first search block 92a in the first current frame 92 and the first reference block 91a in the reference frame 91 is three pixels upward. In a second sampling period, the image sensor captures a second current frame 93 to be stored in the storage unit. At this moment, only the reference block is updated and the reference frame is not, wherein the second reference block 91b is obtained from shifting the first reference block 91a three pixels downward and it is in the reverse direction of the position difference obtained in the first sampling period. Then, the processing unit sequentially searches the second current frame 93 from the top left to the right bottom to find the position of a second search block 93a having the highest correlation with the second reference block 91b, and then calculates a position difference therebetween. In this conventional displacement detection method, an accumulation of small displacement can be detected so as to detect small angle movement by updating the position of reference block rather than updating the reference frame according to the position difference obtained in a previous sampling period.

The present invention further provides a displacement detection apparatus and method that has higher stability and can utilize the sensor array with a smaller size.

SUMMARY

The present disclosure provides a displacement detection apparatus and displacement detection method that can utilize the sensor array with a smaller size so as to reduce the total cost.

The present disclosure further provides a displacement detection apparatus and displacement detection method that has the efficacy of improving the detection stability and inch per second simultaneously by means of real-timely adjusting the size of comparison blocks.

The present disclosure provides a displacement detection method including the steps of: capturing a first frame and a second frame; selecting a first block with a predetermined size in the first frame and a second block with the predetermined size in the second frame; determining a displacement according to the first block and the second block; comparing the displacement with at least one threshold; and adjusting the predetermined size according to a comparison result of comparing the displacement and the threshold.

The present disclosure further provides a displacement detection method including the steps of: capturing a first frame and a second frame; comparing an area with a predetermined size of the first frame with an area with the predetermined size of the second frame; determining a displacement according to a comparison result; decreasing the predetermined size when the displacement is larger than an upper threshold; and increasing the predetermined size when the displacement is smaller than a lower threshold.

The present disclosure further provides a displacement detection apparatus including an image sensing unit, a storage unit and a processing unit. The image sensing unit is configured to capture a first frame and a second frame. The storage unit is configured to store at least one threshold. The processing unit is configured to select a first block with a predetermined size in the first frame and select a second block with the predetermined size in the second frame, determine a displacement according to the first block and the second block, compare the displacement with at least one threshold, and adjust the predetermined size according to a comparison result of comparing the displacement and the threshold.

In the displacement detection apparatus and method of the present disclosure, the displacement is obtained according to the correlation between an area with the predetermined size in the first frame and the second frame, wherein the displacement may be a sum of the absolute value of a displacement in a first direction and the absolute value of a displacement in a second direction perpendicular to the first direction, or a sum of square of a displacement in the first direction and a displacement in the second direction. The displacement detection apparatus of the present disclosure may be an optical mouse.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

It should be noticed that, wherever possible, the same reference numbers will be used throughout the drawings to refer to the same or like parts.

Figure 1:
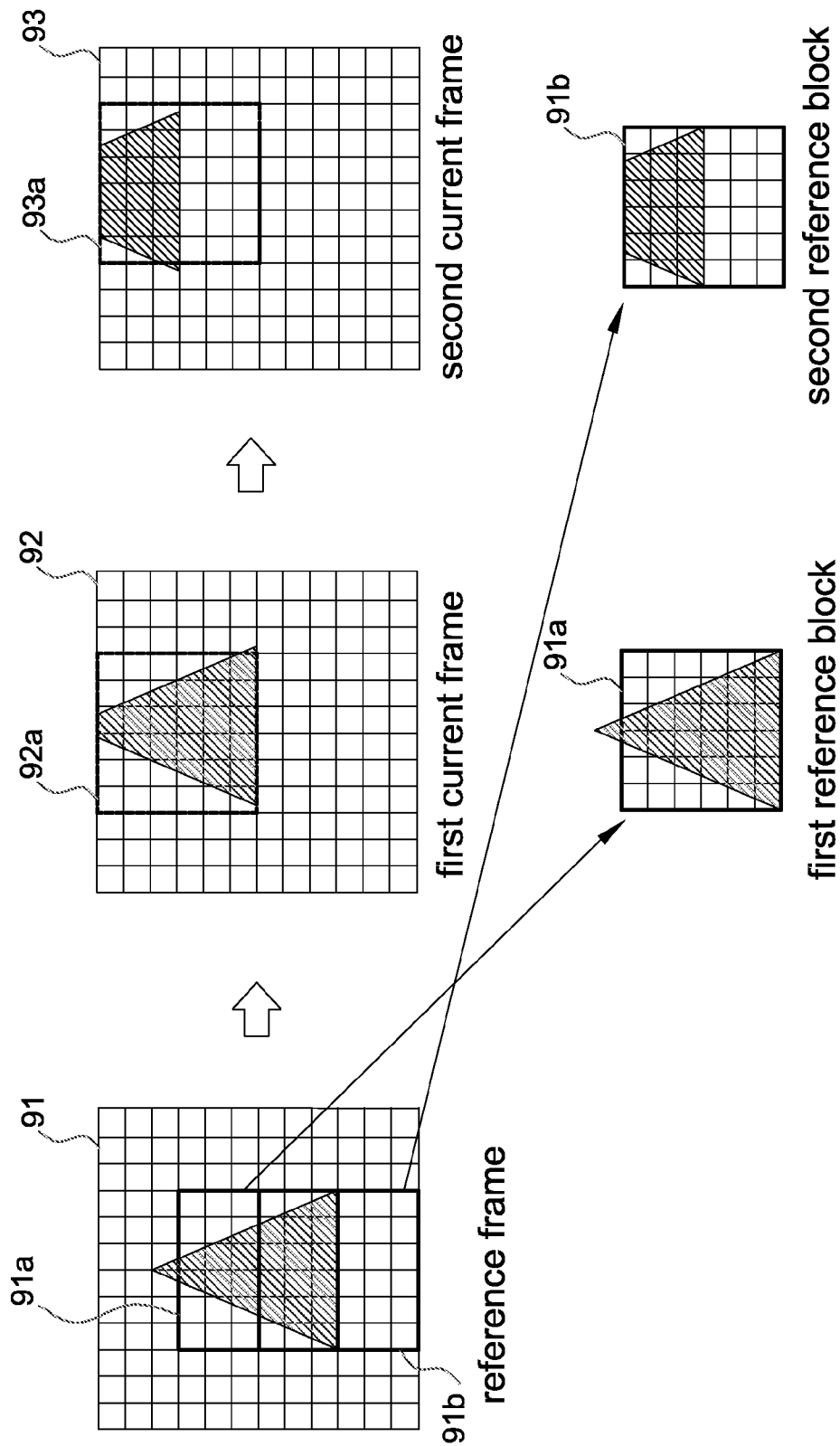
FIG. 1 shows a schematic diagram of a conventional displacement detection method.
Figure 2A:
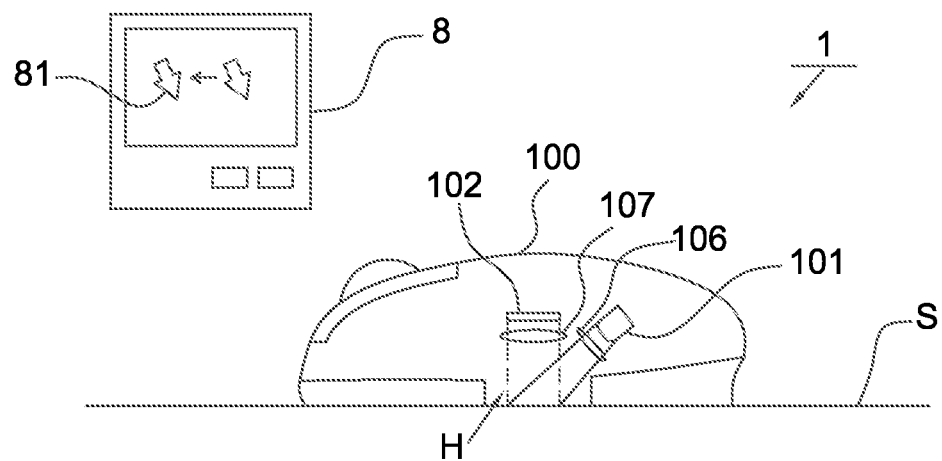
FIG. 2a shows a schematic diagram of the displacement detection apparatus according to the first embodiment of the present invention and a corresponding image display thereof.
Figure 2B:
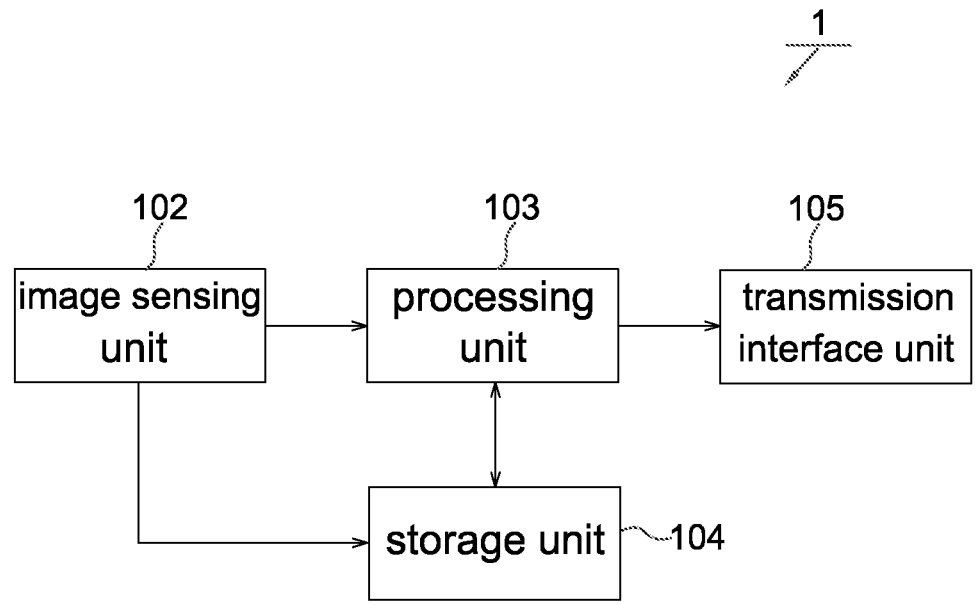
FIG. 2b shows a block diagram of the displacement detection apparatus according to the first embodiment of the present invention.

Please refer to FIGS. 2a and 2b, they respectively show a schematic diagram and a block diagram of the displacement detection apparatus according to the first embodiment of the present invention. In this embodiment, the displacement detection apparatus 1 is shown as an optical mouse, but the present invention is not limited to this. The displacement detection apparatus 1 is generally placed on a working surface S, such that a user may control the operation of an image display 8 by controlling the displacement detection apparatus 1, such as controlling the motion of a cursor 81 shown on the image display 8 or the operation of a software. The image display may be a television screen, a computer screen, a projector screen, a game machine screen or other devices for displaying image.

The displacement detection apparatus 1 includes a case 100 for being operated by a user, and an opening H is formed on the bottom surface of the case 100. Components used to detect the displacement of the displacement detection apparatus 1 with respect to the working surface S are disposed inside the case 100. The displacement detection apparatus 1 includes a light source 101, an image sensing unit 102, a processing unit 103, a storage unit 104 and a transmission interface unit 105. In addition, the displacement detection apparatus 1 may further includes a lens 106 (or lens set) disposed in front of the light-emitting surface of the light source 101 to adjust the illumination range of the light source 101. The displacement detection apparatus 1 may further include another lens 107 (or lens set) disposed in front of the sensor array of the image sensing unit 102 to adjust the sensing efficiency thereof.

Embodiments of the light source 101 include, but not limited to, a light emitting diode or a laser diode, and preferably the light source 101 may be an infrared light emitting diode or an infrared laser diode, but the light source 101 in the present invention is not limited to infrared light sources. The light source 101 is configured to illuminate the working surface S outside the opening H to let the image sensing unit 102 can capture images with sufficient brightness. It can be understood that if the displacement detection apparatus 1 is not an optical mouse, the light source may not be implemented.

Embodiments of the image sensing unit 102 include, but not limited to, a CCD image sensor and a CMOS image sensor, which has a sensor array to sense optical images of the working surface S outside the opening H within a sampling period, and converts the captured optical images to digital image frames to be transmitted to the processing unit 103 for processing. For example if the image sensing unit 102 captures 3,000 frames per second, the sampling period is 1/3,000 second.

The processing unit 103 may be, for example, a digital signal processor (DSP) that is configured to select a search block in a current frame captured by the image sensing unit 102 and to select a reference block in a reference frame stored in the storage unit 104, and then compare the correlation between the reference block and the search block to calculate a displacement of the displacement detection apparatus 1 with respect to the working surface S between two sampling periods; wherein the reference frame is a frame captured by the image sensing unit 102 in a sampling period previous to the sampling period capturing the current frame. In the meanwhile, the processing unit 103 also dynamically adjusts the size of comparison blocks according to the displacement obtained. The comparison blocks include the reference block and the search block herein, wherein details of calculating the displacement and dynamically adjusting the size of comparison blocks will be described hereinafter. It is appreciated that the current frame captured by the image sensing unit 102 may be directly transmitted to the processing unit 103 for comparison, or be stored in the storage unit 104 first and then read out from the storage unit 104 by the processing unit 103 for comparison.

The storage unit 104 is configured to store the reference frame and the current frame captured by the image sensing unit 102, and further to store at least one threshold or a look-up table composed of a plurality of thresholds. The processing unit 103 then compares the threshold with the displacement calculated in every sampling period to real-timely adjust the size of comparison blocks, or determines the size of comparison blocks to be adjusted according to the look-up table. In addition, when the current frame is updated to the reference frame, the updated reference frame is also stored in the storage unit 104.

The transmission interface unit 105 is configured to wirelessly or electrically transmit the displacement obtained by the processing unit 103 and other control signals to the image display 8, wherein the signal transmission method is well know to the art and details will not be described herein.

Figure 3:
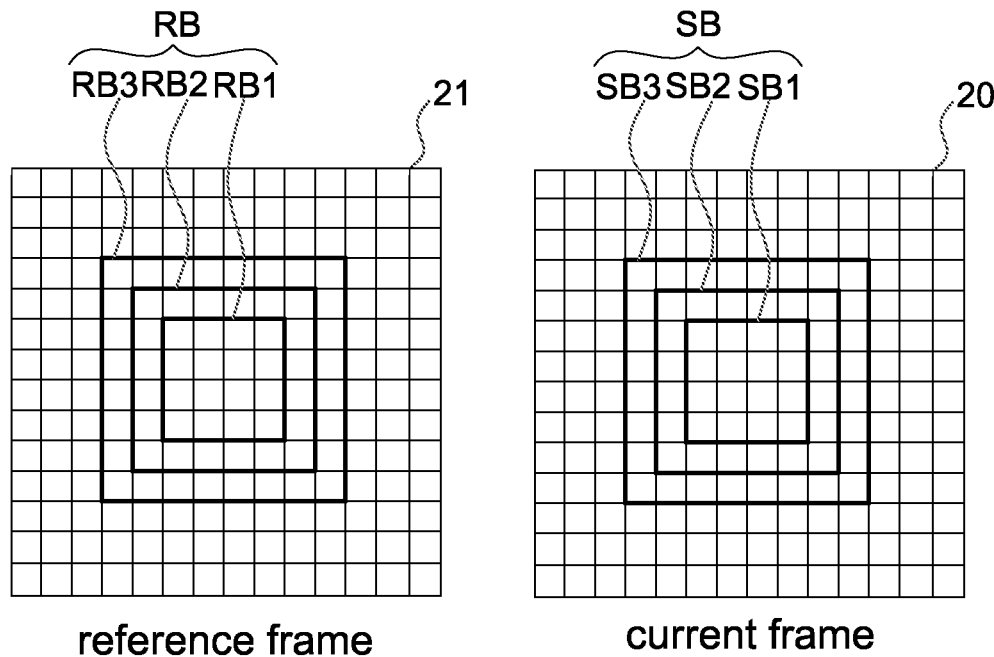
FIG. 3 shows a schematic diagram of the displacement detection method according to the embodiment of the present invention.

Please reference to FIG. 3, it shows a schematic diagram of the displacement detection method according to the embodiment of the present invention. In each sampling period, the image sensing unit 102 captures a current frame 20 and transmits it to the processing unit 103 or stores it in the storage unit 104. At this moment, a reference frame 21, which is captured by the image sensing unit 102 in a previous sampling period, is already stored in the storage unit 104. The processing unit 103 selects a reference block with a predetermined size in the reference frame 21, such as the 6×6 reference block RB2 at the center of the reference frame 21 as a comparison object. The processing unit 103 then sequentially searches the whole current frame 20 with a 6×6 search block SB2 so as to obtain an optimum search block SB2 that has the highest correlation with the reference block RB2, wherein the search sequence may be, for example, from one corner of the current frame 20 to the opposite corner. Then, the processing unit 103 calculates a position difference between a corresponding position of the reference block RB2 in the current frame 20 and the optimum search block SB2 to be served as the displacement of the displacement detection apparatus 1. And then the processing unit 103 compares the calculated displacement with at least one threshold or a look-up table to obtain a size of the comparison blocks used in the next sampling period. For example, if the detected displacement is lower than a lower threshold, larger comparison blocks may be used, such as the comparison blocks SB3 and RB3 with a size of 8×8; Otherwise, if the detected displacement is higher than an upper threshold, smaller comparison blocks may be used, such as the comparison blocks SB1 and RB1 with a size of 4×4, wherein the lower threshold is lower than the upper threshold. Although the size of the current frame 20 and the reference frame 21 is shown as 14×14 in this embodiment, it is only an example rather than a limitation of the present invention.

Generally speaking, the displacement detection apparatus 1 requires a higher detection linearity and stability under low speed moving and needs to be able to detect higher inch per second under high speed moving. If the comparison blocks have a larger size, higher detection linearity and stability can be obtained. On the contrary, if the comparison blocks have a smaller size, inch per second is higher. Therefore, the present invention determines the size of comparison blocks according to the detected displacement so as to increase the detection effectiveness under both high speed and low speed moving.

Figure 4A:
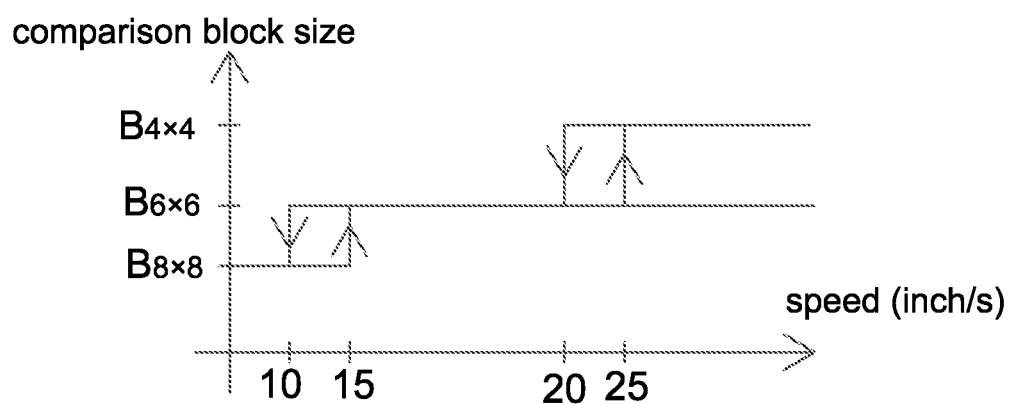
FIG. 4a shows a schematic diagram of the threshold setting in the displacement detection method according to the embodiment of the present invention.
Figure 4B:
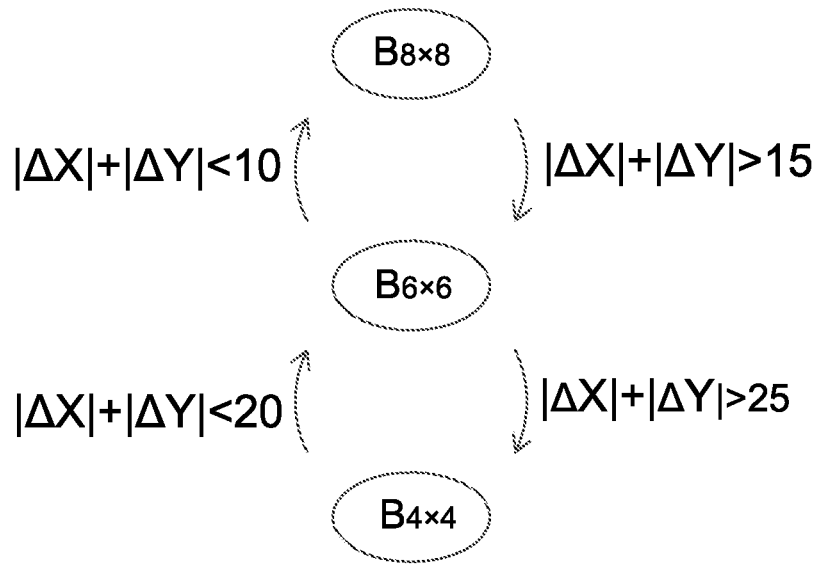
FIG. 4b shows another schematic diagram of the threshold setting in the displacement detection method according to the embodiment of the present invention.
Figure 4C:
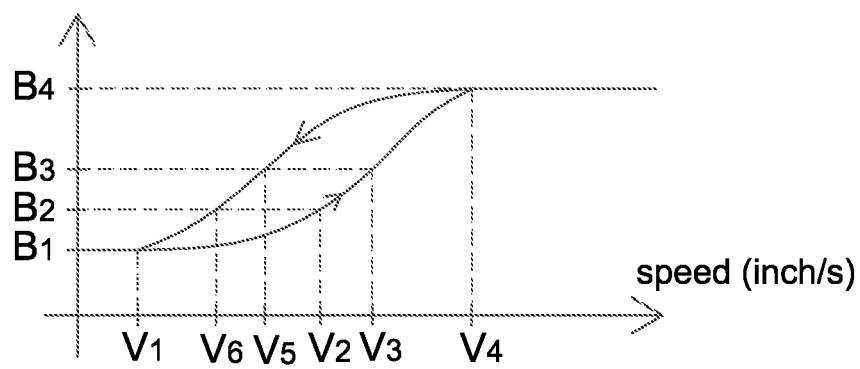
FIG. 4c shows a further schematic diagram of the threshold setting in the displacement detection method according to the embodiment of the present invention.

Please refer to FIGS. 4a to 4c, they show schematic diagrams of the threshold setting in the displacement detection method of the present invention. In the present invention, the threshold is determined according to inch per second (IPS) associated with different sizes of the comparison blocks. In one embodiment, it is assumed that the size of the current frame 20 and the reference frame 21 is 14×14 and a pixel area of the sensor array of the image sensing unit 102 is 30 μm². Therefore, the IPS is equal to $(14-8) \times 30 \times 10^{-3} \times 3,000/25.4 = 21$ when the size of comparison blocks is 8×8; the IPS is equal to $(14-6) \times 30 \times 10^{-3} \times 3,000/25.4 = 28$ when the size of comparison blocks is 6×6; and the IPS is equal to $(14-4) \times 30 \times 10^{-3} \times 3,000/25.4 = 35$ when the size of comparison blocks is 4×4. In the threshold setting above, the processing unit 103 adjusts the size of comparison blocks once a second, but the adjustment period is not limited to once a second. The adjustment period may be larger or smaller than one second and the threshold may also be different according to different adjustment periods.

For example in FIG. 4a, it is assumed that in the displacement detection method of the present invention the processing unit 103 may select one of three sizes of the comparison blocks to perform displacement detection, and the threshold is preferably lower than the IPS detectable by every size of the comparison blocks. For example in the present embodiment, a first upper threshold is set as 15 IPS, a second upper threshold is set as 25 IPS, a first lower threshold is set as 10 IPS and a second lower threshold is set as 20 IPS, wherein values of the upper thresholds and lower thresholds is set different to avoid the oscillation of the size of comparison blocks between two values when a displacement detected by the displacement detection apparatus 1 is close to the set threshold However, the upper and lower thresholds may be identical values.

According to FIG. 4a, if an initial size of comparison blocks is set as 6×6 and when the movement in a second detected by the processing unit 103 is larger than 25 IPS, the size of comparison blocks will be adjusted to 4×4 in the next sampling period. When the movement in a second detected by the processing unit 103 is smaller than 10 IPS, the size of comparison blocks will be adjusted to 8×8 in the next sampling period. Otherwise, the size of comparison blocks will be maintained as 6×6. Similarly, when the initial size of comparison blocks is 4×4 or 8×8, the processing unit 103 will adjust the size of comparison blocks used in the next sampling period according to the relation between the threshold and the detected movement in a second. It is appreciated that the values of the threshold shown herein are only examples rather than limitations of the present invention.

FIG. 4b shows another schematic diagram of the threshold setting in the displacement detection method of the present invention, wherein the displacement calculated by the processing unit 103 may be further divided as a displacement in the X direction $\Delta X$ and a displacement in the Y direction $\Delta Y$, wherein the X direction is perpendicular to the Y direction. The processing unit 103 may compare a sum of the absolute value of $\Delta X$ and the absolute value of $\Delta Y$, a sum of square of $\Delta X$ and $\Delta Y$, or any one of $\Delta X$ and $\Delta Y$ with the threshold, and determines the size of comparison blocks used in the next sampling period according to a comparison result. For example, FIG. 4b shows a method comparing a sum of the absolute value of a displacement in the X direction $\Delta X$ and the absolute value of a displacement in the Y direction $\Delta Y$ with the threshold. In addition, the representation of the displacement is not limited to that described herein, and other representations are also applicable to the displacement detection method of the present invention, such as a square root of a sum of squares of a displacement in the X direction $\Delta X$ and a displacement in the Y direction $\Delta Y$.

Please refer to FIG. 4c, it shows another schematic diagram of the threshold setting according to the embodiment of the present invention, wherein the relation of the movement in a second calculated by the processing unit 103 and the threshold is set as following: when the moving speed detected increases gradually and when the moving speed exceeds a first speed V1, the size of comparison blocks is selected as B1; and when the moving speed exceeds a second speed V2, the size of comparison blocks is selected as B2; and when the moving speed exceeds a third speed V3, the size of comparison blocks is selected as B3; and when the moving speed exceeds a fourth speed V4, the size of comparison blocks is selected as B4. On the contrary, when the moving speed detected decreases gradually and when the moving speed is lower than a fifth speed V5, the size of comparison blocks is selected as B3; and when the moving speed is lower than a sixth speed V6, the size of comparison blocks is selected as B2. In addition, a plurality of thresholds and corresponding sizes of the comparison blocks may be formed as a look-up table in the present invention. The processing unit 103 may select a proper size of the comparison blocks according to the look-up table.

Figure 5A:
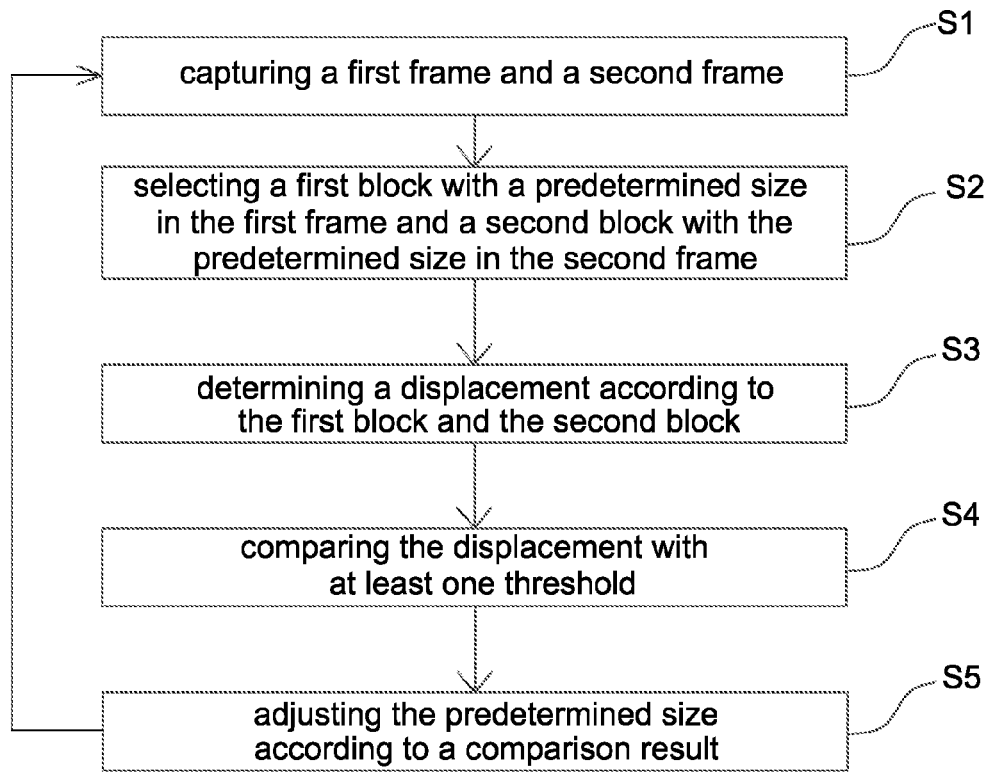
FIG. 5a shows a flow chart of the displacement detection method according to an embodiment of the present invention.

Please refer to FIG. 5a, it shows a flow chart of the displacement detection method according to an embodiment of the present invention, which includes the steps of: capturing a first frame and a second frame (Step S1); selecting a first block with a predetermined size in the first frame and a second block with the predetermined size in the second frame (Step S2); determining a displacement according to the first block and the second block (Step S3); comparing the displacement with at least one threshold (Step S4); and adjusting the predetermined size according to a comparison result of comparing the displacement and the threshold (Step S5).

Figure 5B:
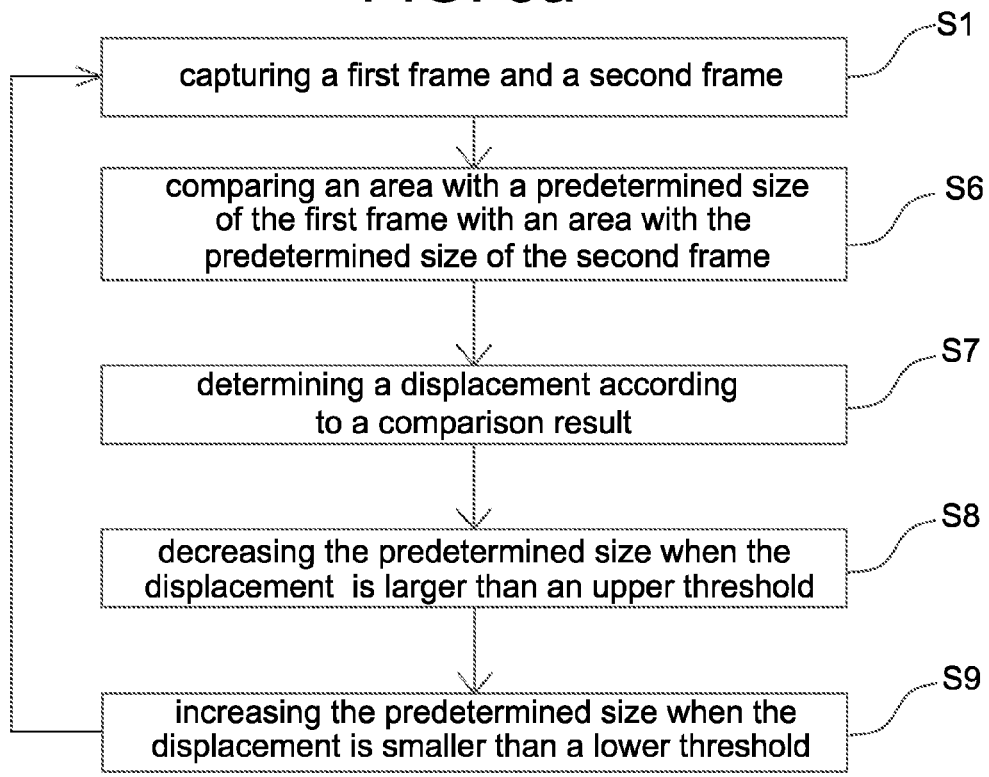
FIG. 5b shows a flow chart of the displacement detection method according to another embodiment of the present invention.

Please refer to FIG. 5b, it shows a flow chart of the displacement detection method according to another embodiment of the present invention, which includes the steps of: capturing a first frame and a second frame (Step S1); comparing an area with a predetermined size of the first frame with an area with the predetermined size of the second frame (Step S6); determining a displacement according to a comparison result (Step S7); decreasing the predetermined size when the displacement is larger than an upper threshold (Step S8); increasing the predetermined size when the displacement is smaller than a lower threshold (Step S9).

It is appreciated that the displacement detection method of the present invention is not limited to the embodiments shown in the present invention, and it can be adapted to other cursor control apparatuses and pointer control apparatuses. That is, the displacement detection method of the present invention can be applied to any detection apparatus that can control a cursor movement or the operation of a software by detecting a relative displacement between the detection apparatus and a reference object.

A displacement detection apparatus that utilizes the displacement detection method of the present invention can use smaller sensor array to achieve identical detection efficiency. For example, if a 16×16 sensor array and 8×8 comparison blocks are used in a conventional detection apparatus, a 14×14 sensor array and 8×8, 6×6, or 4×4 comparison blocks can be used in the present invention to achieve identical displacement detection efficiency.

In other embodiments, the displacement detection apparatus 1 may further determine the size of comparison blocks (abbreviated as block size hereinafter) according to at least one of an image quality and an exposure parameter as well as a displacement; for example, determining a block size according to the image quality and/or the exposure parameter and then determining a sub block size according to the displacement; for example, determining a block size according to the displacement and then determining a sub block size according to the image quality and/or the exposure parameter.

Figure 6:
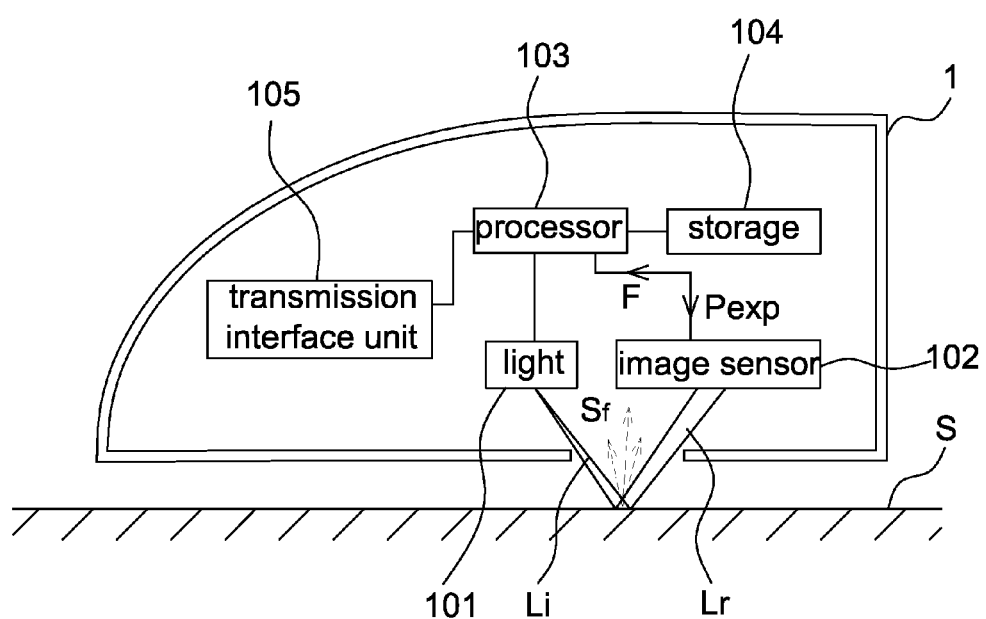
FIG. 6 shows another schematic block diagram of the displacement detection apparatus according to the embodiment of the present disclosure.

Referring to FIG. 6, it shows another schematic block diagram of the displacement detection apparatus according to the embodiment of the present disclosure. The displacement detection apparatus 1 also includes the light source 101, the image sensing unit 102, the processing unit 103, the storage unit 104 and the transmission interface unit 105.

The light source 101 may emit a main beam Li to illuminate the working surface S and reflected light from the working surface S forms a main reflection optical path Lr, wherein as the working surface S is not a perfect mirror surface, a scattered field Sf is formed outside the main reflection optical path Lr. For example, if the light source 101 emits light with the same brightness, when the working surface S is smoother, the intensity of the main reflection optical path Lr is higher and the intensity of the scattered field Sf is weaker; whereas when the working surface S is rougher, the intensity of the main reflection optical path Lr is weaker and the intensity of the scattered field Sf is higher. Accordingly, it is able to identify whether the working surface S is a smooth surface, e.g. a glass surface, or not according to intensities of the main reflection optical path Lr and the scattered field Sf. A smooth surface includes fewer surface features and a rough surface includes more surface features.

The image sensing unit 102 captures the reflected light from the working surface S at a sampling frequency and an exposure parameter and outputs current frames, wherein the exposure parameter may include an exposure time and/or an image gain. In this embodiment, the exposure parameter is determined by the processing unit 103. When the value of the exposure parameter is increased, the average brightness of the image frame F outputted by the image sensing unit 102 is increased. In this embodiment, the disposed position of the image sensing unit 102 may determine the bright field arrangement or the dark field arrangement, and different arrangements may determine the setting of the exposure threshold (described hereinafter).

The processing unit 103 adjusts the block size of the comparison blocks according to the features revealed by the current frame 20 and the obtained displacement (described later).

The processing unit 103 may further calculate brightness (e.g. the average brightness, maximum brightness or local average brightness) so as to control the exposure parameter Pexp of the image sensing unit 102. The processing unit 103 may further calculate a quality parameter of the current frame 20 and adjust a block size of the search block SB according to the exposure parameter and/or the quality parameter as well as the calculated displacement. It is appreciated that the processing unit 103 preferably adjusts block sizes of the search block SB and the reference block RB simultaneously.

The storage unit 104 is configured to save the reference frame 21 (captured before the search frame SB), at least one exposure threshold, at least one quality threshold, a ratio threshold and/or a lookup table, wherein the lookup table may include block sizes corresponding to different quality parameters (thresholds) and/or different exposure parameters (thresholds).

Figure 7:
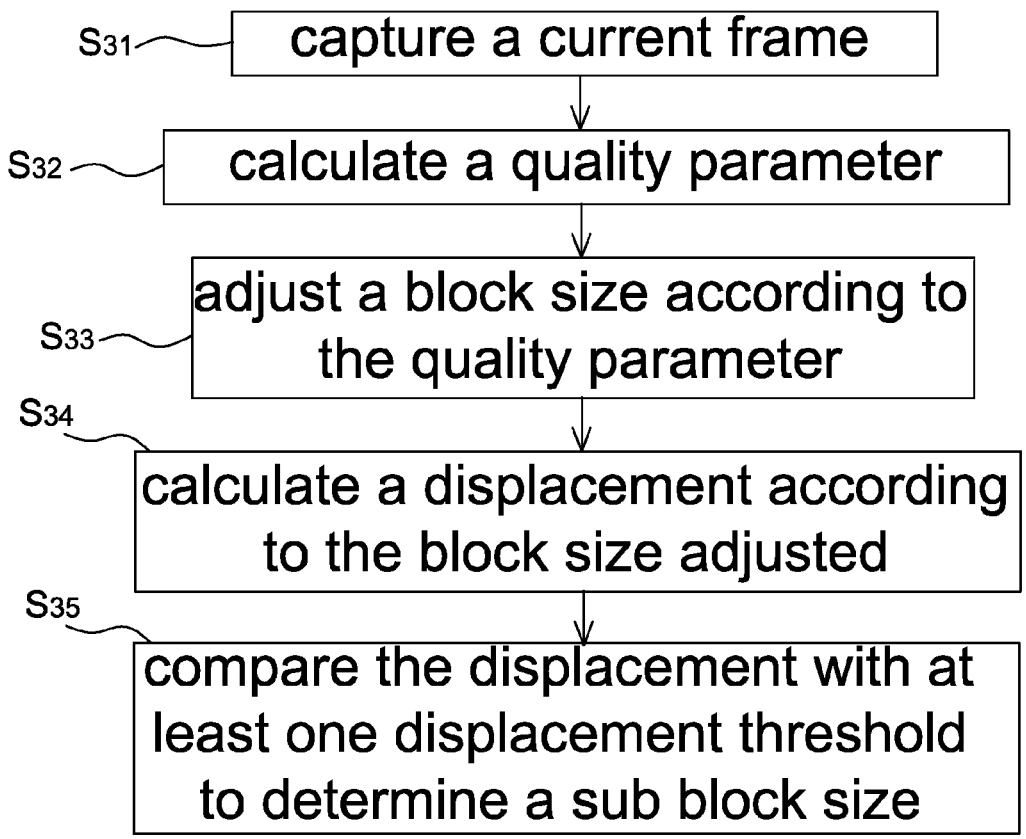
FIG. 7 shows a flow chart of the displacement detection method according to a second embodiment of the present disclosure.

Referring to FIG. 7, it shows a flow chart of the operating method of the displacement detection apparatus according to the second embodiment of the present disclosure, which includes the steps of: capturing a current frame (Step $S_{31}$); calculating a quality parameter (Step $S_{32}$); adjusting a block size according to the quality parameter (Step $S_{33}$); calculating a displacement according to the block size adjusted (Step $S_{34}$); and comparing the displacement with at least one displacement threshold to accordingly determine a sub block size (Step $S_{35}$). This embodiment adjusts a main block size of the comparison blocks according to the image quality at first and then adjusts a sub block size associated with the main block size according to the displacement.

Figure 7A:
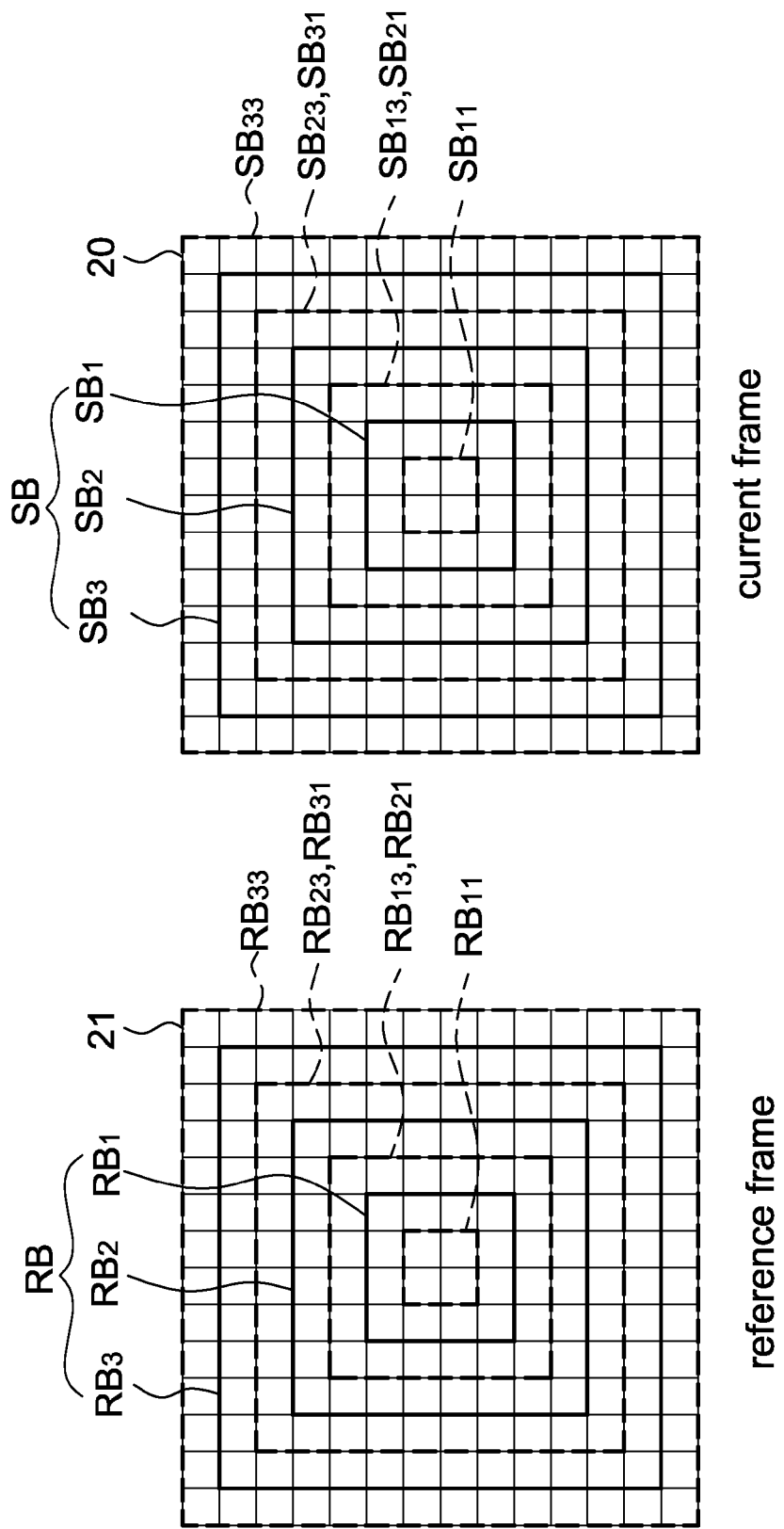
FIG. 7a shows a schematic diagram of the comparison blocks captured by the image sensing unit according to the embodiment of the present disclosure.

Referring to FIGS. 6, 7 and 7a, details of the operating method of this embodiment are described hereinafter. FIG. 7a shows a schematic diagram of the comparison blocks captured by the image sensing unit 102.

Step $S_{31}$: The image sensing unit 102 captures a current frame 20 at a sampling frequency corresponding to the lighting of the light source 101 as shown in FIG. 7a. Herein, the processing unit 103 may set the comparison block SB to a predetermined size, e.g. a second block size SB2.

Step $S_{32}$: The processing unit 103 then calculates a quality parameter of the current frame 20 for indicating the features of the working surface S, wherein the quality parameter may be a digitized parameter, e.g. a sharpness, a contrast, a feature directivity, a number of local maximum in the current frame 20. When the digitized value is higher, the working surface S is rougher; whereas when the digitized value is lower, the working surface S is smoother. The image quality may be referred to U.S. Pat. Nos. 7,142,695, 7,444,006 and 7,116,801 assigned to the same assignee of the present application, and the full disclosure of which are incorporated herein by reference.

Step $S_{33}$: The processing unit 103 identifies whether the working surface S is a smooth surface (i.e. identifying whether containing enough surface features) according to a comparison result of comparing the quality parameter and a quality threshold. For example, when the quality parameter is smaller than the quality threshold, the processing unit 103 identifies that the working surface S is a smooth surface (i.e. not containing enough surface features for calculating displacement). When the quality parameter is larger than or equal to the quality threshold, the processing unit identifies that the working surface is not a smooth surface (i.e. containing enough surface features for calculating displacement). When the processing unit 103 identifies that the working surface S is a smooth surface according to current frames captured within a predetermined time interval, e.g. according to one or a plurality of current frames 20 within the predetermined time interval, the block size is increased, wherein said a plurality of current frames may be 16 current frames, 32 current frames and so on so as to prevent the block size from being changed constantly thereby improving the system stability. When the processing unit 103 identifies that the working surface S is not a smooth surface according to current frames 20 captured within a predetermined time interval, the block size is decreased or set to a predetermined block size. In this embodiment, the quality threshold may be determined according to a size of the sensing array of the image sensing unit 102 and/or the adaptable working surface.

Step $S_{34}$: The processing unit 103 then selects a reference block RB in the reference frame 21 having the block size adjusted and selects a search block SB in the current frame 20 having the block size adjusted (as FIG. 7a) to accordingly calculate a displacement as described in the first embodiment.

Step $S_{35}$: The processing unit 103 then compares the displacement with at least one displacement threshold as described in the first embodiment (e.g. FIGS. 4a-4c) so as to determine a sub block size associated to the block size adjusted. Referring to FIG. 7a, it is assumed that the block size has a second block size SB2, and the second block size may include second sub block sizes SB21, SB22 and SB23. In one embodiment, the second sub block size SB22 is equal to the second block size SB2, the second sub block size SB21 is smaller than the second block size SB2 and the second sub block size SB23 is larger than the second block size SB2, wherein the first sub block sizes and the third sub block sizes are similar to the second sub block sizes. For example, the sub block size may further be configured to increase or decrease the block size by one pixel or maintain the block size. As shown in FIG. 7a, the pixel difference between the comparison blocks SB1-SB3 is preferably larger than 2 pixels such that the third sub block sizes SB31, SB32 and SB33 are all larger than the second block size SB2, the second sub block sizes SB21, SB22 and SB23 are all larger than the first block size SB1 and smaller than the third block size SB3; and the first sub block sizes SB11, SB12 and SB13 are all smaller than the second block size SB2. In this manner, the displacement detection apparatus 1 may further adjust the size of comparison blocks according to the displacement under suitable image quality.

Figure 8:
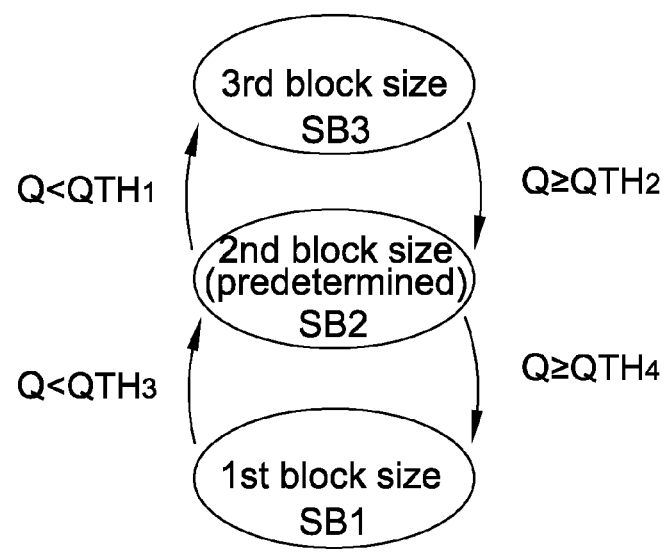
FIG. 8 shows a schematic diagram of the displacement detection method according to the second embodiment of the present disclosure.

Referring to FIG. 8, it shows a schematic diagram of the operating method of the displacement detection apparatus according to the second embodiment of the present disclosure.

Figure 8A:
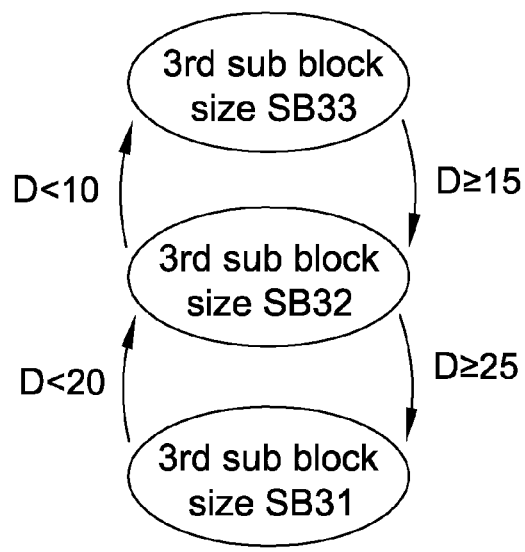
FIGS. 8a-8c respectively show a schematic diagram of determining sub block size in the displacement detection method according to the embodiment of the present disclosure.
Figure 8B:
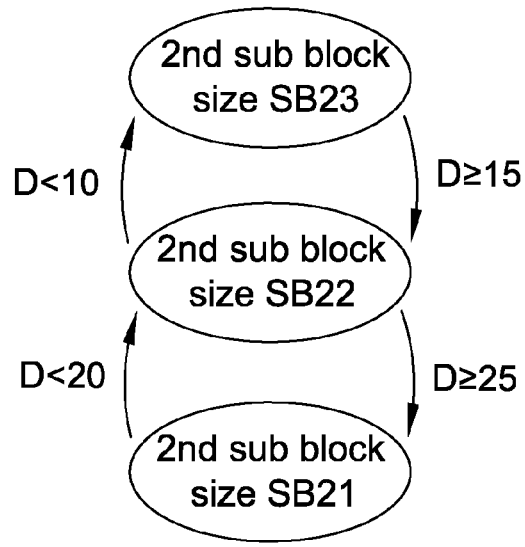
Figure 8C:
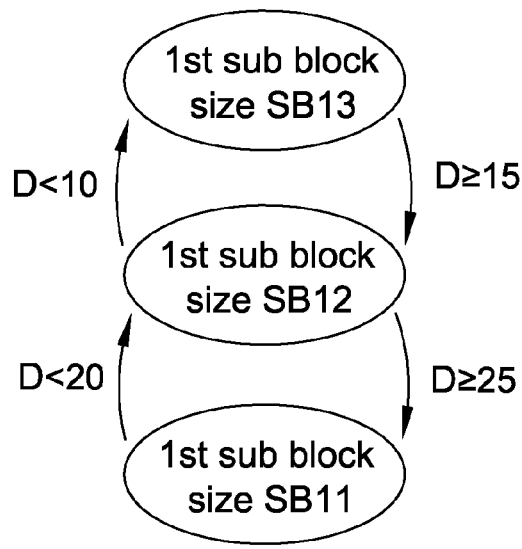

The image sensing unit 102 captures a current frame 20 and transmits the current frame 20 to the processing unit 103 (Step $S_{31}$). The processing unit 103 calculates a quality parameter Q of the current frame 20 (Step $S_{32}$) to be compared with at least one quality threshold. It is assumed that a current block size is a predetermined size (e.g. SB2). When the quality parameter Q is smaller than a first quality threshold QTH1, the processing unit 103 uses a third block size (e.g. SB3) to scan the current frame 20 for calculating the displacement (Step $S_{33}$-$S_{34}$). Next, similar to the first embodiment the processing unit 103 compares the displacement with at least one displacement threshold so as to adjust the third block size SB3 to be one of the third sub block sizes SB31, SB32 and SB33 (Step $S_{35}$) as shown in FIG. 8a, wherein SB33>SB32>SB31. On the other hand, when the quality parameter Q is larger than or equal to a fourth quality threshold QTH4, the processing unit 103 uses a first block size (e.g. SB1) to scan the current frame 20 for calculating the displacement (Step $S_{33}$-$S_{34}$). Next, similar to the first embodiment the processing unit 103 compares the displacement with at least one displacement threshold so as to adjust the first block size SB 1 to be one of the first sub block sizes SB11, SB12 and SB13 (Step $S_{35}$) as shown in FIG. 8c, wherein SB13>SB12>SB11.

It is assumed that a current block size is the third block size SB3. When the quality parameter Q is larger than or equal to a second quality threshold QTH2, the processing unit 103 uses a second block size (e.g. SB2) to scan the current frame 20 for calculating the displacement. Next, similar to the first embodiment the processing unit 103 compares the displacement with at least one displacement threshold so as to adjust the second block size SB2 to be one of the second sub block sizes SB21, SB22 and SB23, as shown in FIG. 8b, wherein SB23>SB22>SB21. Otherwise, the block size is maintained as the third block size SB3 and the third block size SB3 is adjusted to be one of the third sub block sizes according to the displacement, as shown in FIG. 8a.

It is assumed that a current block size is the first block size SB 1. When the quality parameter Q is smaller than a third quality threshold QTH3, the processing unit 103 increases the block size to the second block size SB2 which is adjusted to be one of the second sub block sizes according to the displacement, as shown in FIG. 8b. Otherwise, the block size is maintained as the first block size SB1 which is adjusted to be one of the first sub block sizes according to the displacement, as shown in FIG. 8c.

In this embodiment, the third quality threshold QTH3 is larger than the first quality threshold QTH1, and the fourth quality threshold QTH4 is larger than the second quality threshold QTH2. The first quality QTH1 may or may not be equal to the second quality threshold QTH2, and the third quality threshold QTH3 may or may not be equal to the fourth quality threshold QTH4. More specifically, in the second embodiment the processing unit 103 may adjust or maintain the block size of the comparison blocks according to a comparison result of comparing the image quality of a current frame with at least one quality threshold, and then further adjust or maintain the sub block size of the comparison blocks (being adjusted or not) according to the displacement.

Figure 9:
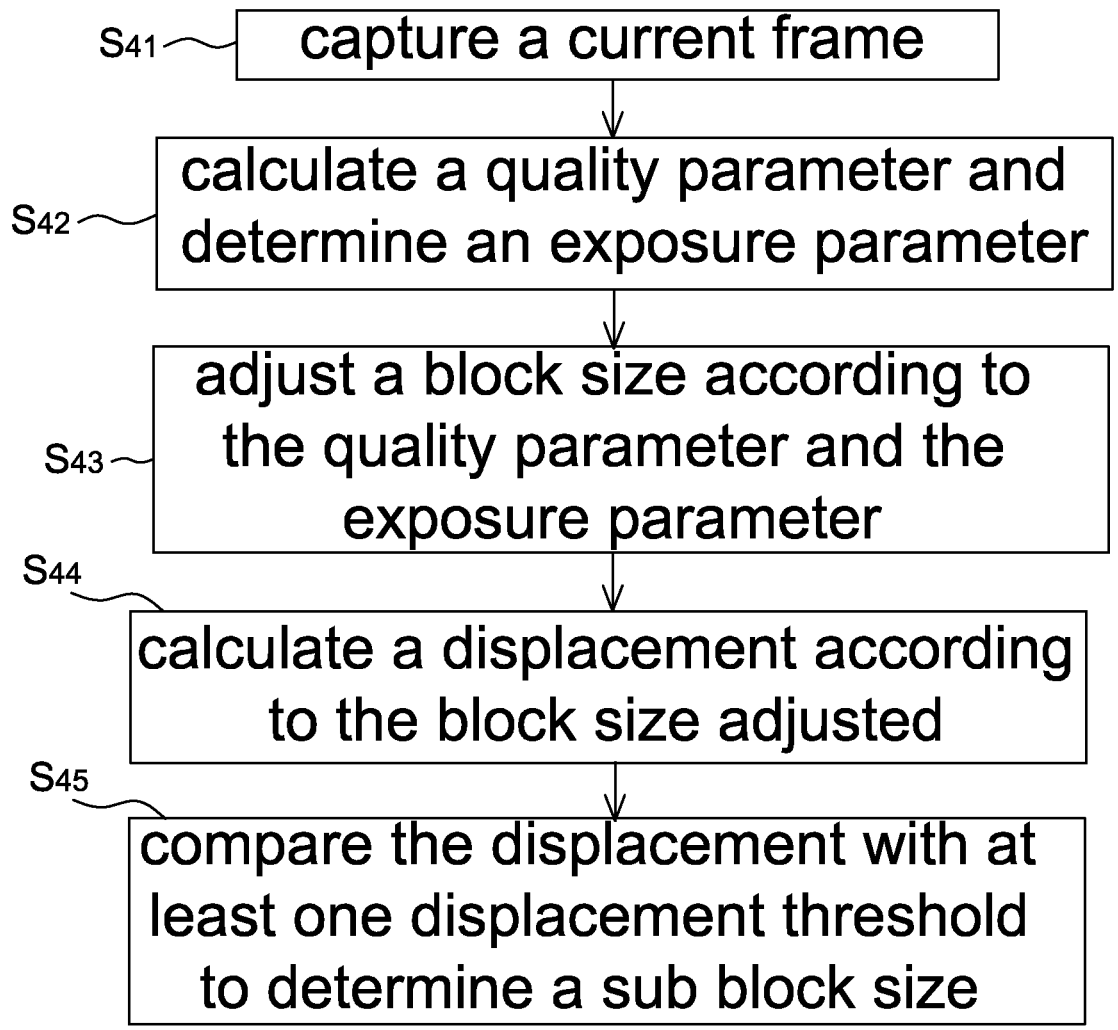
FIG. 9 shows a flow chart of the displacement detection method according to a third embodiment of the present disclosure.

Referring to FIG. 9, it shows a flow chart of the operating method of the displacement detection apparatus according to a third embodiment of the present disclosure. The difference between the third embodiment and the second embodiment is that in the third embodiment the processing unit 103 adjusts the block size further according to an exposure parameter of the image sensing unit 102. More specifically, in the third embodiment, the processing unit 103 compares a quality parameter with a quality threshold and compares an exposure parameter with an exposure threshold so as to determine the block size. For example, when the processing unit 20 identifies that the working surface S does not contain enough surface features according to one or a plurality of current frames, the block size is increased. For example when the working surface S is a smooth surface, the current frames may not contain enough image features. When the processing unit 10 identifies that the working surface S contains enough surface features according to one or a plurality of current frames, the block size is decreased or set to a predetermined block size (described hereinafter). For example, when the working surface S is not a smooth surface, the current frames generally contain enough image features.

In one embodiment, a plurality of quality parameters and exposure parameters may be formed as a lookup table with respect to a plurality of block sizes. The processing unit 103 may compare a pair of quality parameter and exposure parameter with the lookup table so as to determine the block size.

Figure 10A:
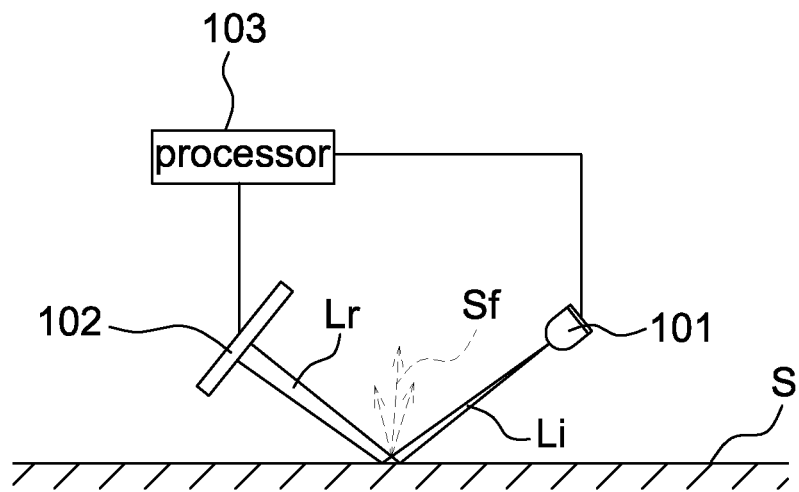
FIG. 10a shows a schematic diagram of the bright field arrangement of the displacement detection apparatus according to the embodiment of the present disclosure.
Figure 11A:
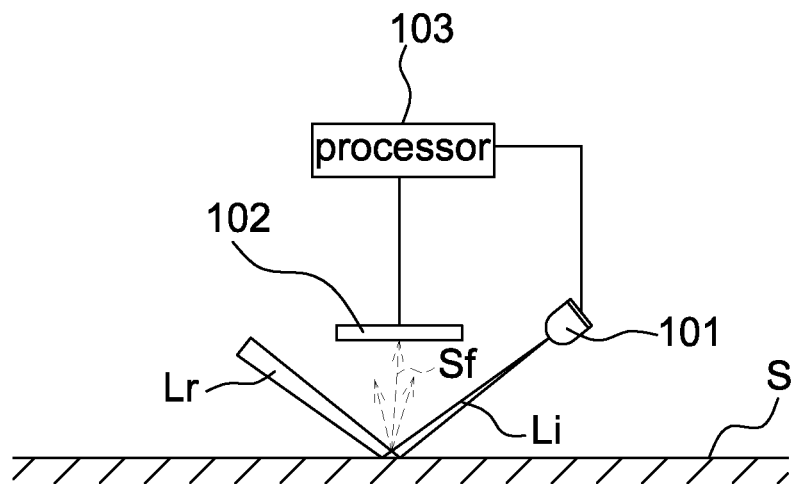
FIG. 11a shows a schematic diagram of the dark field arrangement of the displacement detection apparatus according to the embodiment of the present disclosure.

The operating method of the displacement detection apparatus according to the third embodiment of the present disclosure includes the steps of: capturing a current frame (Step $S_{41}$); calculating a quality parameter and determining an exposure parameter (Step $S_{42}$); adjusting a block size according to the quality parameter and the exposure parameter (Step $S_{43}$); calculating a displacement according to the block size adjusted (Step $S_{44}$); and comparing the displacement with at least one displacement threshold to accordingly determine a sub block size (Step $S_{45}$). In the third embodiment, a bright field arrangement or a dark field arrangement may be formed according to the disposed position of the image sensing unit 102, wherein in the bright field arrangement the image sensing unit 102 is disposed on the main reflection optical path Lr as shown in FIG. 10a; in the dark field arrangement the image sensing unit 102 is disposed at the scattered field Sf (i.e. outside the main reflection optical path Lr) as shown in FIG. 11a.

Referring to FIGS. 6, 7a, 9 and 10a, details of the bright field arrangement in the third embodiment are described firstly.

Step $S_{41}$: The image sensing unit 102 captures a current frame 20 at a sampling frequency corresponding to the lighting of the light source 101. Herein, the processing unit 103 may set the comparison block to a predetermined size, e.g. a second block size SB2.

Step $S_{42}$: The processing unit 103 then calculates a quality parameter of the current frame 20 and determines an exposure parameter for indicating the surface features of the working surface S, wherein the calculation of the quality parameter is similar to the second embodiment and thus details thereof are not repeated herein. The processing unit 103 calculates brightness of the current frame 20 so as to control the exposure parameter of the image sensing unit 102.

Step $S_{43}$: The processing unit 103 identifies whether the working surface S is a smooth surface according to the exposure parameter and the quality parameter to accordingly identify whether to adjust the block size of the comparison blocks. For example, when the quality parameter is smaller than a quality threshold and the exposure parameter is smaller than an exposure threshold, the processing unit 103 identifies that the working surface S is a smooth surface. As mentioned above, in order improve the stability, the processing unit 103 may increase the block size when identifying that the working surface S is a smooth surface according to current frames captured within a predetermined time interval. In addition, when the processing unit 103 identifies that the working surface S is not a smooth surface according to current frames captured within a predetermined time interval, i.e. the quality parameter being larger than or equal to a quality threshold and the exposure parameter being larger than or equal to an exposure threshold, the block size is decreased or set to a predetermined block size.

Step $S_{44}$-$S_{45}$: After the block size is determined, similar to the steps $S_{34}$-$S_{35}$ the processing unit 103 further adjusts the sub block size according to the displacement, similar to the second embodiment.

Figure 10B:
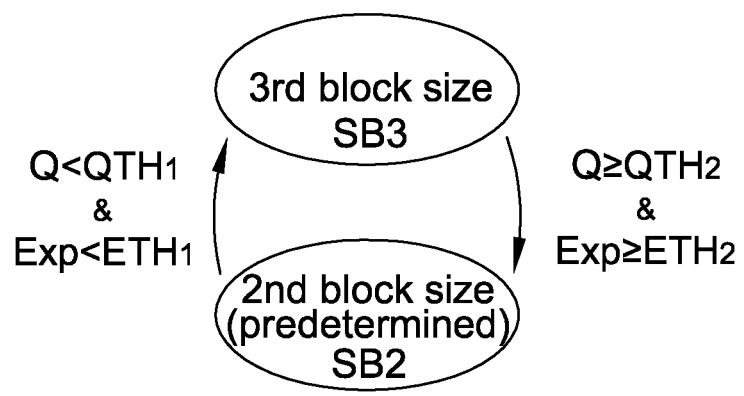
FIG. 10b shows a schematic diagram of the displacement detection method according to the third embodiment of the present disclosure.

Referring to FIG. 10b, it shows a schematic diagram of the operating method of the displacement detection apparatus of FIG. 10a.

The image sensing unit 102 captures a current frame 20 and transmits the current frame 20 to the processing unit 103 (Step $S_{41}$). The processing unit 103 calculates a quality parameter Q of the current frame 20 and determines an exposure parameter Exp (Step $S_{42}$) and compares the quality parameter Q with at least one quality threshold and compares the exposure parameter Exp with at least one exposure threshold.

It is assumed that a current block size is a predetermined size (e.g. SB2). When the quality parameter Q is smaller than a first quality threshold QTH1 and the exposure parameter Exp is smaller than a first exposure threshold ETH1, the processing unit 103 uses a third block size (e.g. SB3) to scan the current frame 20 for calculating the displacement (Step $S_{43}$-$S_{44}$). Next, similar to the first embodiment the processing unit 103 compares the displacement with at least one displacement threshold so as to adjust the third block size SB3 to be one of the third sub block sizes SB31, SB32 and SB33 (Step $S_{45}$) as shown in FIG. 8a. Otherwise, the block size is maintained as the second block size SR2 and the processing unit 103 uses the second block size SB2 to scan the current frame 20 for calculating the displacement (Step $S_{43}$-$S_{44}$). Next, similar to the first embodiment the processing unit 103 compares the displacement with at least one displacement threshold so as to adjust the second block size SB2 to be one of the second sub block sizes SB21, SB22 and SB23 (Step $S_{45}$) as shown in FIG. 8b.

It is assumed that a current block size is the third block size SB3. When the quality parameter Q is larger than or equal to a second quality threshold QTH2 and the exposure parameter Exp is larger than or equal to a second exposure threshold ETH2, the processing unit 103 decreases the block size to the second block size SB2 which is then adjusted to be one of the second sub block sizes according to the displacement, as shown in FIG. 8b. Otherwise, the block size is maintained as the third block size SB3 which is then adjusted to be one of the third sub block sizes according to the displacement, as shown in FIG. 8a. In this embodiment, the first quality threshold QTH1 may or may not be equal to the second quality threshold QTH2; and the first exposure threshold ETH1 may or may not be equal to the second exposure threshold ETH2.

Referring to FIGS. 6, 7a, 9 and 11a, details of the dark field arrangement in the third embodiment are described next.

Step $S_{41}$: The image sensing unit 102 captures a current frame 20 at a sampling frequency corresponding to the lighting of the light source 101. Herein, the processing unit 103 may set the comparison block to a predetermined size, e.g. a second block size SB2.

Step $S_{42}$: The processing unit 103 then calculates a quality parameter of the current frame 20 and determines an exposure parameter for indicating the surface features of the working surface S, wherein the calculation of the quality parameter is similar to the second embodiment and thus details thereof are not repeated herein. The processing unit 103 calculates brightness of the current frame 20 so as to control the exposure parameter of the image sensing unit 102.

Step $S_{43}$: The processing unit 103 identifies whether the working surface S is a smooth surface according to the exposure parameter and the quality parameter to accordingly identify whether to adjust the block size of the comparison blocks. For example, when the quality parameter is smaller than a quality threshold and the exposure parameter is larger than or equal to an exposure threshold, the processing unit 103 identifies that the working surface S is a smooth surface. As mentioned above, in order improve the stability, the processing unit 103 may increase the block size when identifying that the working surface S is a smooth surface according to current frames captured within a predetermined time interval. When the processing unit 103 identifies that the working surface S is not a smooth surface according to current frames captured within a predetermined time interval, i.e. the quality parameter being larger than or equal to a quality threshold and the exposure parameter being smaller than an exposure threshold, the block size is decreased or set to a predetermined block size.

In another embodiment, the processing unit 103 may compare a quotient of the quality parameter divided by the exposure parameter with a ratio threshold so as to identify whether the working surface S is a smooth surface. For example, when the processing unit 103 identifies that the quotient is smaller than the ratio threshold according to current frames captured within a predetermined time interval, the processing unit 103 identifies that the working surface S is a smooth surface, whereas when the processing unit 103 identifies that the quotient is larger than or equal to the ratio threshold according to current frames captured within a predetermined time interval, the processing unit 103 identifies that the working surface S is not a smooth surface.

Step $S_{44}$-$S_{45}$: After the block size is determined, similar to the steps $S_{34}$-$S_{35}$ the processing unit 103 further adjusts the sub block size according to the displacement, similar to the second embodiment.

Figure 11B:
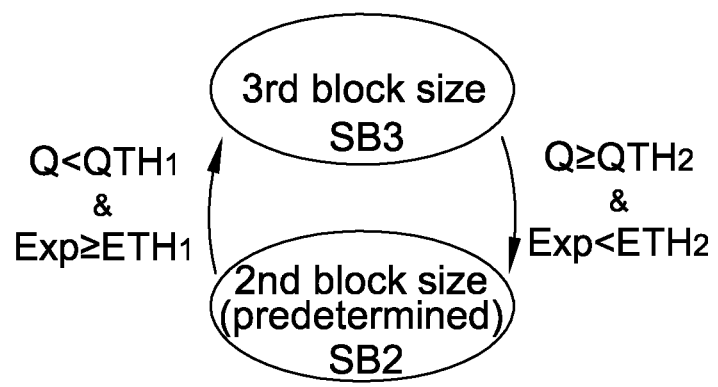
FIG. 11b shows another schematic diagram of the displacement detection method according to the third embodiment of the present disclosure.

Referring to FIG. 11b, it shows a schematic diagram of the operating method of the displacement detection apparatus of FIG. 11a.

The image sensing unit 102 captures a current frame 20 and transmits the current frame 20 to the processing unit 103 (Step $S_{41}$). The processing unit 103 calculates a quality parameter Q of the current frame 20 and determines an exposure parameter Exp (Step $S_{42}$) and compares the quality parameter Q with at least one quality threshold and compares the exposure parameter Exp with at least one exposure threshold.

It is assumed that a current block size is a predetermined size (e.g. SB2). When the quality parameter Q is smaller than a first quality threshold QTH1 and the exposure parameter Exp is larger than or equal to a first exposure threshold ETH1 (or a quotient of the quality parameter divided by the exposure parameter is smaller than a first ratio threshold), the processing unit 103 uses a third block size (e.g. SB3) to scan the current frame 20 for calculating the displacement (Step $S_{43}$-$S_{44}$). Next, similar to the first embodiment the processing unit 103 compares the displacement with at least one displacement threshold so as to adjust the third block size SB3 to be one of the third sub block sizes SB31, SB32 and SB33 (Step $S_{45}$), as shown in FIG. 8a. Otherwise, the block size is maintained as the second block size SR2 and the processing unit 103 uses the second block size SB2 to scan the current frame 20 for calculating the displacement (Step $S_{43}$-$S_{44}$). Next, similar to the first embodiment the processing unit 103 compares the displacement with at least one displacement threshold so as to adjust the second block size SB2 to be one of the second sub block sizes SB21, SB22 and SB23 (Step $S_{45}$), as shown in FIG. 8b.

It is assumed that a current block size is the third block size SB3. When the quality parameter Q is larger than or equal to a second quality threshold QTH2 and the exposure parameter Exp is smaller than a second exposure threshold ETH2 (or a quotient of the quality parameter divided by the exposure parameter is larger than or equal to a second ratio threshold), the processing unit 103 decreases the block size to the second block size SB2 which is then adjusted to be one of the second sub block sizes according to the displacement, as shown in FIG. 8b. Otherwise, the block size is maintained as the third block size SB3 which is then adjusted to be one of the third sub block sizes according to the displacement, as shown in FIG. 8a. In this embodiment, the first quality threshold QTH1 may or may not be equal to the second quality threshold QTH2; the first exposure threshold ETH1 may or may not be equal to the second exposure threshold ETH2; and the first ratio threshold may or may not be equal to the second ratio threshold.

It is appreciated that in the operating method of the displacement detection apparatus in the third embodiment, more than two quality thresholds and/or exposure thresholds may be used and the selectable block sizes may be more than 2 as shown in FIG. 8 without being limited to those shown in FIGS. 10b and 11b.

In another embodiment, the processing unit 103 may identify whether the working surface S is a smooth surface or not only according to a comparison result of the exposure parameter and at least one exposure threshold. When the working surface S is a smooth surface, the block size is increased, whereas when the working surface S is not a smooth surface, the block size is decreased; that is, FIGS. 10b and 11b only include the comparison between the exposure parameter Exp and the exposure thresholds ETH1 and ETH2. After the block size is determined, as shown in FIGS. 8a-8c the processing unit 103 further determines the sub block size associated with the block size (being adjusted or not) according to a comparison result of comparing the displacement with at least one displacement threshold. Details of this embodiment are similar to the third embodiment and thus not repeated herein.

Figure 12A:
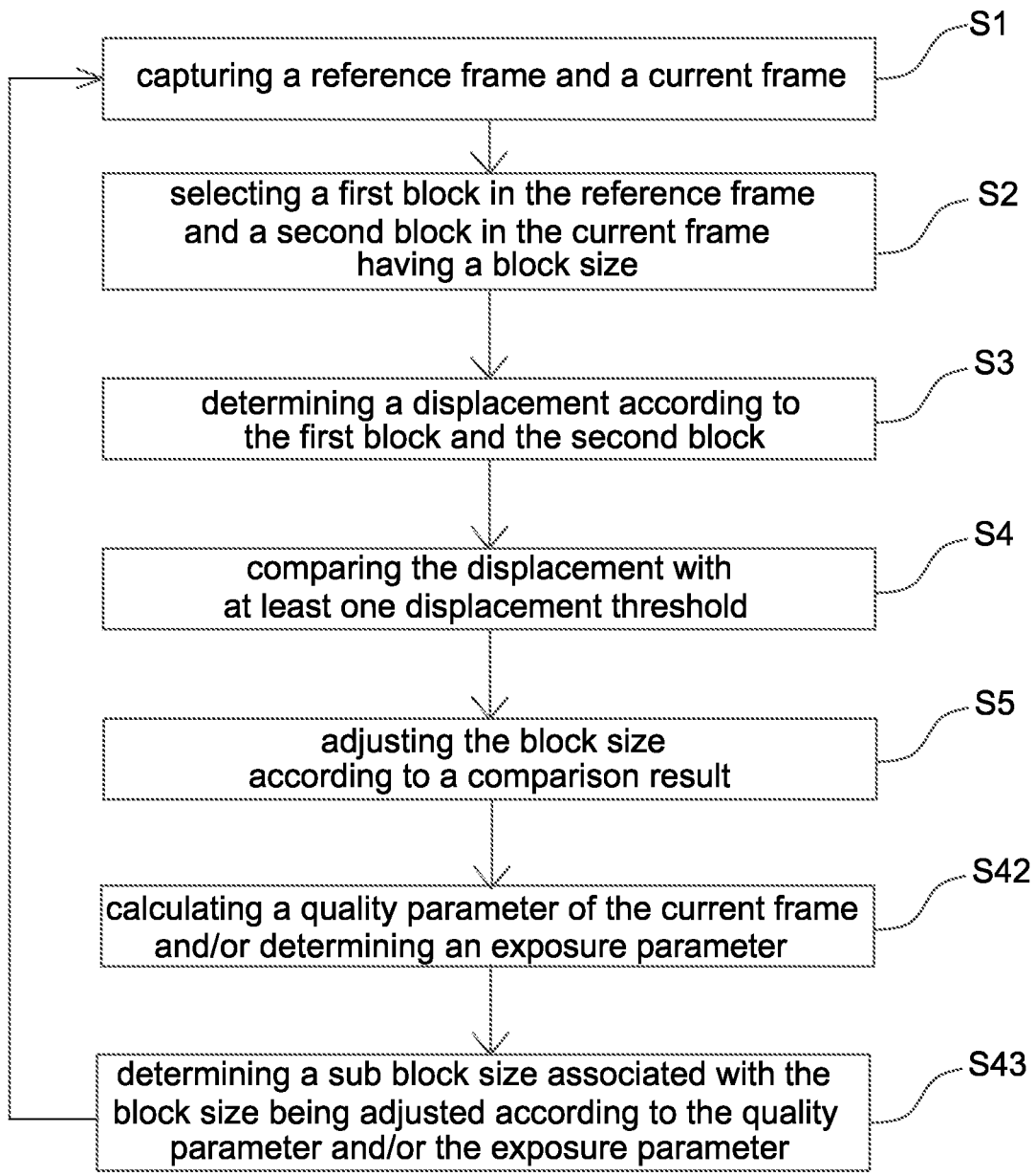
FIGS. 12a-12b respectively show a flow chart of the displacement detection method according to another embodiment of the present disclosure.
Figure 12B:
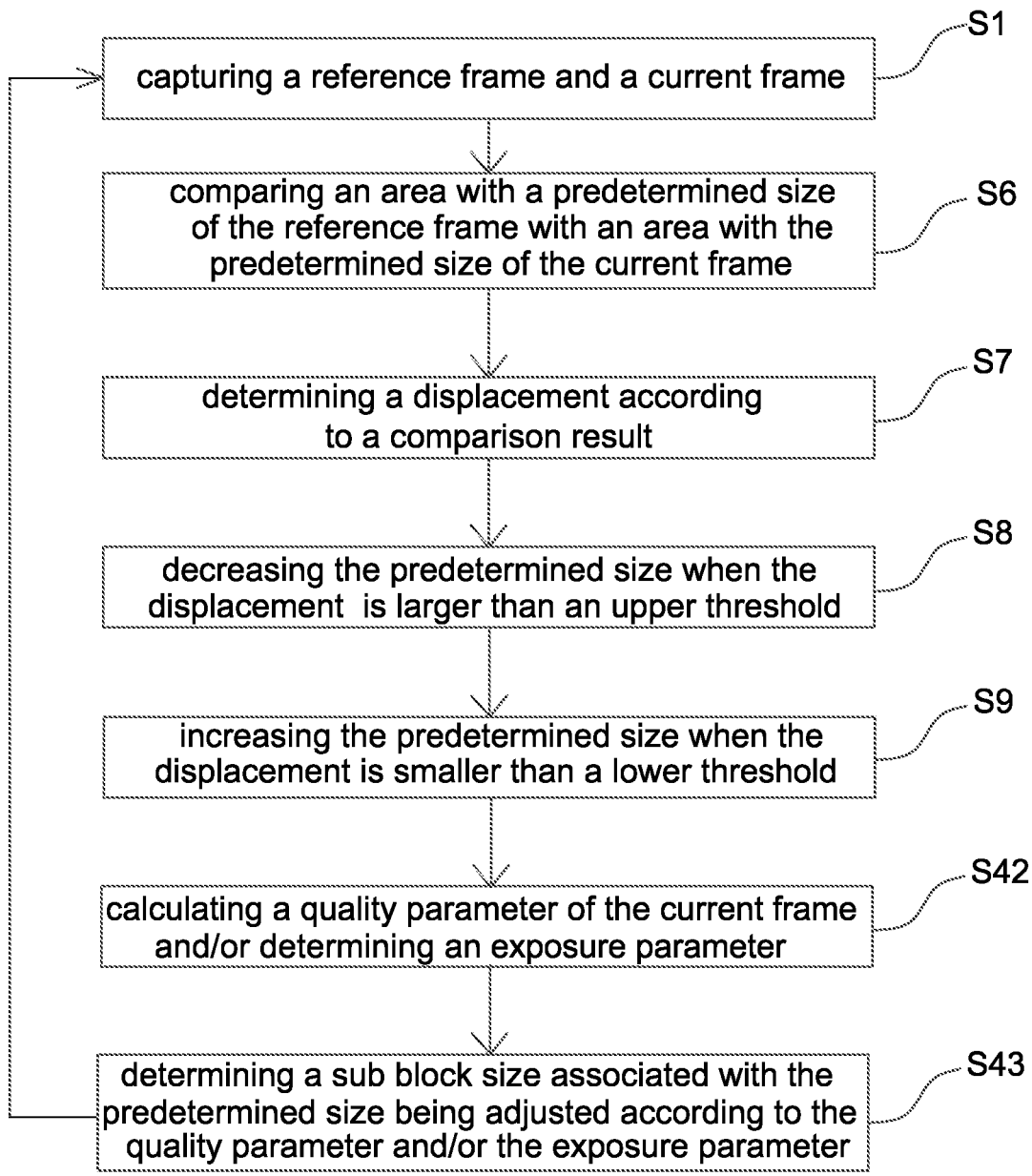

In another embodiment, the processing unit 103 may firstly determine a block size according to a comparison result of comparing the displacement with at least one displacement threshold (as shown in FIGS. 4a-4c) and then determines a sub block size associated with the block size (being adjusted or not) according to a comparison result of comparing the quality parameter with at least one quality threshold (as FIG. 8) and/or comparing the exposure parameter with at least one exposure threshold (as FIGS. 10b and 11b). That is, the comparisons in FIGS. 8a-8c are replaced by the comparison between the quality parameter Q and the quality threshold QTH and/or the comparison between the exposure parameter Exp and the exposure threshold ETH. More specifically, this embodiment determines a main block size according to the displacement at first and then determines a sub block size associated with the main block size according to the quality parameter and/or the exposure parameter, wherein as shown in FIG. 7b an adjustable pixel step of the sub block size is preferably smaller than an adjustable pixel step of the block size. Details of this embodiment are shown by FIGS. 12a and 12b, which are different from the second and third embodiments only in the sequence of conditions for determining the block size and sub block size and thus details thereof are not repeated herein. For example, FIG. 12a is a combination of FIG. 5a and a part of FIG. 9a, and FIG. 12b is a combination of FIG. 5b and a part of FIG. 9a.

It should be mentioned that the smooth surface mentioned herein means that the working surface S has fewer surface features but preferably sill has enough features for calculating the displacement. It is appreciated that when the quality parameter is smaller than a critical threshold, the displacement may not be obtained even by changing the block size. The thresholds mentioned herein may be a threshold range rather than a value.

As mentioned above, because conventional displacement detection apparatuses have disadvantages of unable to identify small displacement and insufficient accuracy, the present invention further provides a displacement detection apparatus (FIGS. 2a, 2b and 6) and a displacement detection method (FIGS. 5a and 5b) that can adjust the size of comparison blocks adaptively, and increase the displacement detection stability and detectable maximum speed (inch per second). Furthermore, the present invention can use smaller sensor array to reduce the total cost.

Although the invention has been explained in relation to its preferred embodiment, the present invention is not limited to this. It is to be understood that many other possible modifications and variations can be made by those skilled in the art without departing from the spirit and scope of the invention as hereinafter claimed.

What is claimed is:

1. A displacement detection apparatus, for being operated on a working surface, the displacement detection apparatus comprising:
    an image sensing unit capturing a reference frame and a current frame;
    a storage unit configured to save at least one displacement threshold; and
    a processing unit configured to
        select a first block in the reference frame and a second block in the current frame, wherein the first block and the second block have a block size;
        calculate a displacement according to the first block and the second block;
        compare the displacement with the at least one displacement threshold to accordingly adjust the block size;
        calculate a quality parameter of the current frame; and
        determine a sub block size associated with the block size adjusted according to at least one of the quality parameter and an exposure parameter.

2. The displacement detection apparatus as claimed in claim 1, wherein an adjustable pixel step of the sub block size is smaller than an adjustable pixel step of the block size.

3. The displacement detection apparatus as claimed in claim 1, further comprising a light source configured to emit a main beam illuminating the working surface to form a main reflection optical path, wherein the image sensing unit is located on the main reflection optical path and captures the current frame with the exposure parameter.

4. The displacement detection apparatus as claimed in claim 3, wherein the sub block size is increased when at least one of (i) the quality parameter being smaller than a quality threshold and (ii) the exposure parameter being smaller than an exposure threshold.

5. The displacement detection apparatus as claimed in claim 3, wherein the sub block size is decreased when at least one of (i) the quality parameter being larger than a quality threshold and (ii) the exposure parameter being larger than an exposure threshold.

6. The displacement detection apparatus as claimed in claim 1, further comprising a light source configured to emit a main beam illuminating the working surface to form a main reflection optical path, wherein the image sensing unit is located outside the main reflection optical path and captures the current frame with the exposure parameter.

7. The displacement detection apparatus as claimed in claim 6, wherein the sub block size is increased when at least one of (i) the quality parameter being smaller than a quality threshold and (ii) the exposure parameter being larger than an exposure threshold.

8. The displacement detection apparatus as claimed in claim 6, wherein the sub block size is increased when a quotient of the quality parameter divided by the exposure parameter is smaller than a ratio threshold.

9. The displacement detection apparatus as claimed in claim 6, wherein the sub block size is decreased when at least one of (i) the quality parameter being larger than a quality threshold and (ii) the exposure parameter being smaller than an exposure threshold.

10. The displacement detection apparatus as claimed in claim 1, wherein the block size is a first size or a second size, and the second size is smaller than the first size; the at least one displacement threshold comprises an upper threshold and a lower threshold, and the lower threshold is lower than the upper threshold,
    for the block size being the first size, the processing unit adjusts the block size to the second size when the displacement is larger than the upper threshold;
    for the block size being the first size, the processing unit maintains the block size as the first size when the displacement is smaller than the upper threshold;
    for the block size being the second size, the processing unit adjusts the block size to the first size when the displacement is smaller than the lower threshold; and
    for the block size being the second size, the processing unit maintains the block size as the second size when the displacement is larger than the lower threshold.

11. A displacement detection apparatus, for being operated on a working surface, the displacement detection apparatus comprising:
    an image sensing unit capturing a reference frame and a current frame;
    a storage unit configured to save at least one displacement threshold; and a processing unit configured to
- select a first block in the reference frame and a second block in the current frame, wherein the first block and the second block have a block size;
- calculate a quality parameter of the current frame;
- adjust the block size according to at least one of the quality parameter and an exposure parameter;
- calculate a displacement according to the first block having the block size adjusted and the second block having the block size adjusted; and
- compare the displacement with the at least one displacement threshold to accordingly determine a sub block size associated with the block size adjusted.

12. The displacement detection apparatus as claimed in claim 11, wherein an adjustable pixel step of the sub block size is smaller than an adjustable pixel step of the block size.

13. The displacement detection apparatus as claimed in claim 11, further comprising a light source configured to emit a main beam illuminating the working surface to form a main reflection optical path, wherein the image sensing unit is located on the main reflection optical path and captures the current frame with the exposure parameter.

14. The displacement detection apparatus as claimed in claim 13, wherein the block size is increased when at least one of (i) the quality parameter being smaller than a quality threshold and (ii) the exposure parameter being smaller than an exposure threshold.

15. The displacement detection apparatus as claimed in claim 13, wherein the block size is decreased when at least one of (i) the quality parameter being larger than a quality threshold and (ii) the exposure parameter being larger than an exposure threshold.

16. The displacement detection apparatus as claimed in claim 11, further comprising a light source configured to emit a main beam illuminating the working surface to form a main reflection optical path, wherein the image sensing unit is located outside the main reflection optical path and captures the current frame with the exposure parameter.

17. The displacement detection apparatus as claimed in claim 16, wherein the block size is increased when at least one of (i) the quality parameter being smaller than a quality threshold and (ii) the exposure parameter being larger than an exposure threshold.

18. The displacement detection apparatus as claimed in claim 16, wherein the block size is increased when a quotient of the quality parameter divided by the exposure parameter is smaller than a ratio threshold.

19. The displacement detection apparatus as claimed in claim 16, wherein the block size is decreased when at least one of (i) the quality parameter being larger than a quality threshold and (ii) the exposure parameter being smaller than an exposure threshold.

20. The displacement detection apparatus as claimed in claim 11, wherein the sub block size is a first size or a second size, and the second size is smaller than the first size; the at least one displacement threshold comprises an upper threshold and a lower threshold, and the lower threshold is lower than the upper threshold,
- for the sub block size being the first size, the processing unit adjusts the sub block size to the second size when the displacement is larger than the upper threshold;
- for the sub block size being the first size, the processing unit maintains the sub block size as the first size when the displacement is smaller than the upper threshold;
- for the sub block size being the second size, the processing unit adjusts the sub block size to the first size when the displacement is smaller than the lower threshold; and
- for the sub block size being the second size, the processing unit maintains the sub block size as the second size when the displacement is larger than the lower threshold.

\* \* \* \* \*